G. H. CHANDLEE.
AUTOMOBILE ATTACHMENT.
APPLICATION FILED FEB. 12, 1910.
973,856.
Patented Oct. 25, 1910.
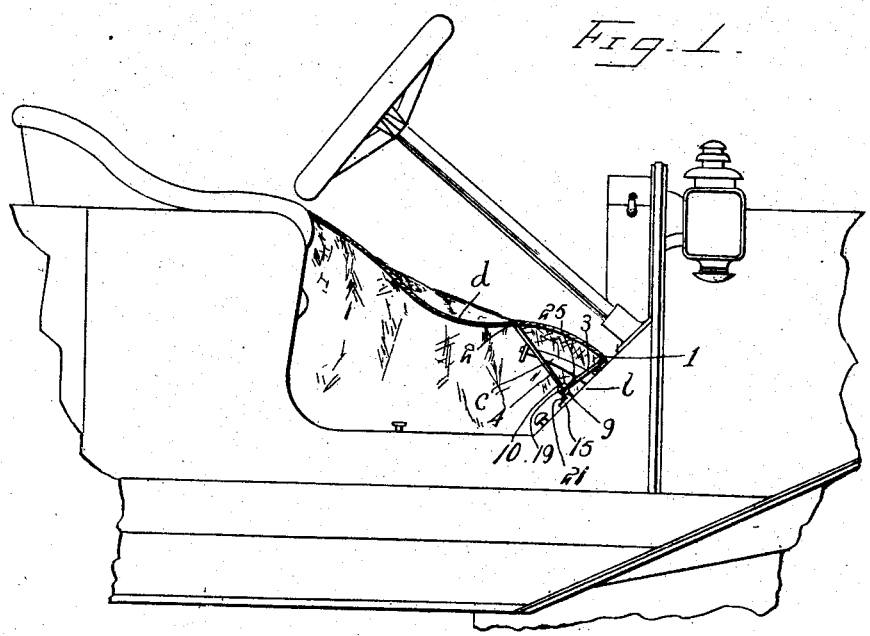
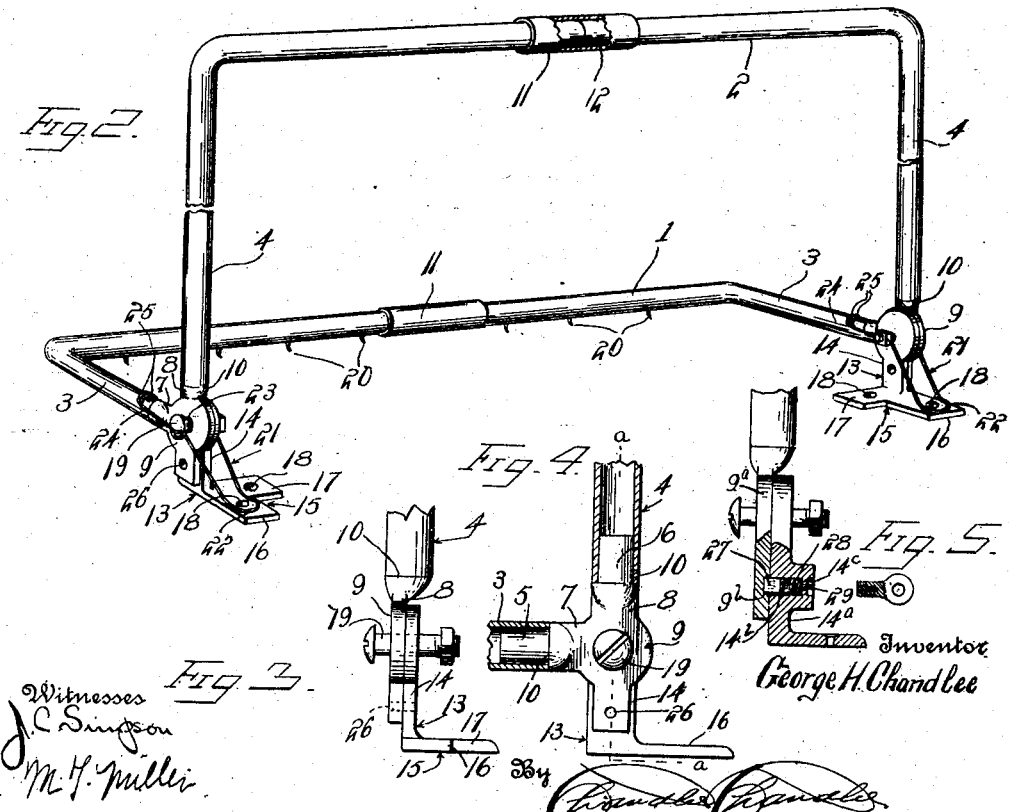
Witnesses
J. C. Simpson
M. J. Miller
Inventor
George H. Chandlee
By
Chandlee & Chandlee
Attorneys

UNITED STATES PATENT OFFICE.

GEORGE H. CHANDLEE, OF CHEVY CHASE, MARYLAND.

AUTOMOBILE ATTACHMENT.

973,856.  Specification of Letters Patent.  Patented Oct. 25, 1910.

Application filed February 12, 1910. Serial No. 543,476.

*To all whom it may concern:*

Be it known that I, GEORGE H. CHANDLEE, a citizen of the United States, residing at Chevy Chase, in the county of Montgomery, State of Maryland, have invented certain new and useful Improvements in Automobile Attachments; and I do hereby declare the following to be a full, clear, and exact description of the invention, such as will enable others skilled in the art to which it appertains to make and use the same.

This invention is an improved automobile attachment providing means for securing the front end of a lap robe on the foot board of an automobile and for supporting the contiguous front portion of the robe clear of the sweep of the pedals so as to prevent the robe from fouling the pedals and interfering with the ready operation thereof, the said invention consisting in the construction, combination and arrangement of devices hereinafter described and claimed.

One object of the invention is to provide a device of this character which may be readily attached to any automobile.

Another object is to provide a device of this character which will secure the lap robe against surreptitious removal.

A further object is to provide a device of this character which may be adjusted according to the width of the automobile body on which the same is to be used.

A still further object of the invention is to provide a pivotally mounted lap robe holder and supporter embodying robe securing means and robe supporting means, the latter forming a handle by means of which the device may be readily turned to engaged or disengaged position.

In the accompanying drawings:—Figure 1 is an elevation of a portion of the body of an automobile provided with my improved lap robe securing and supporting attachment, also showing the lap robe in section. Fig. 2 is a detail perspective view of my improved lap robe securing and supporting attachment for automobiles, a portion of one of the sleeves being indicated as broken away and in section. Fig. 3 is a detail elevation showing one of the supporting brackets and the portion of the lap robe holder and supporter pivoted thereto. Fig. 4 is a similar view of the same at right angles to Fig. 3 and showing portions of the end arms of the securing and supporting bars in section. Fig. 5 is a detail sectional view on the plane indicated by the line *a—a* of Fig. 4, illustrating a modification.

In the embodiment of the invention here shown, which it is understood is only a preferred form of the invention and may be modified within the scope of the appended claims, there is provided a lap robe securing bar 1 and a robe supporting bar 2, both of which are bowed or arched so that their ends 3, 4 respectively are at substantially right-angles to their intermediate portions and converge, the said end arms or portions 3 and 4 of the said bars being, in other words, disposed in angular relation. Said bars are preferably, and are here shown, as tubular. Their converging or angularly disposed ends are secured on the studs 5, 6 of angularly related arms 7, 8 of hub members 9, which serve to unite the ends of said bars 1, 2 together. The ends of said bars abut against shoulders 10, formed on said arms at the bases of said studs. The said robe securing and robe supporting bars are preferably longitudinally adjustable so that the length of the attachment may be varied as may be required to enable the same to be used on an automobile of any width of body and for the purposes of this specification said bars are shown as made of separable sections, one intermediate portion of each bar being provided with a socket sleeve 11, for the reception of the end portion 12, of the other section, said socket sleeve permitting the longitudinal adjustment of the bars, as will be understood.

In practice my improved lap robe holding and supporting attachment is mounted above the foot board of an automobile for movement of the securing bar or member toward and from the foot board to permit the securing and detachment of the front end of the said robe and for the purposes of this specification I show as such supporting means a pair of brackets 13, each of which comprises a standard portion 14, and a base portion 15, the latter to bear upon the foot board. The base portion of each supporting member is also here shown as comprising a pair of arms 16, 17, which are disposed at right angles to each other, said arm 16 extending transversely on the foot board and from the rear side of the standard. The said arms are provided with openings 18 for the reception of screws or other suitable devices by which the said supporting members may be secured on the foot board.

The hub devices 9 of the lap robe holder and supporter bear against the outer sides of the standards 14 and are pivotally connected thereto by means of bolts 19. The robe securing bar 1 extends forwardly from the supporting members and across the foot board of the automobile and is movable toward and from the foot board so as to secure the front end of the lap robe between said bar and the foot bar or permit the detachment thereof from between them, the pivotal mounting of the device permitting such movement of the said securing bar, and the supporting bar 2 serves conveniently as a handle or lever for thus moving the lap robe holder as well as for supporting the front portion of the lap robe above the pedals of the automobile and clear of the sweep thereof so as to prevent the lap robe from lying on and fouling the pedals and interfering with their operation. The foot board is indicated at $b$ and one of the pedals is indicated at $c$ in Fig. 1.

Within the scope of my invention the bar 1 or lap robe securing element may be of any suitable construction and provided with any suitable means for securing the front end of the lap robe on the foot board and also for preventing the surreptitious removal of the lap robe from the automobile. For the purposes of this specification the said bar is shown provided with downwardly extending prongs 20, to pass through the fabric of the lap robe when the said bar bears upon the robe and presses it against the foot bar so as to cause the said bar to coact with the foot board in thus securing the front end of the robe.

In Fig. 1 of the drawings a lap robe is indicated at $d$ with its front end secured by the bar 1, and its contiguous front portion bearing on the bar 2, and supported thereby above the pedals of the automobile and clear of the sweep thereof and hence it will be understood that the said bar 2 prevents the lap robe from getting upon and fouling the pedals and interfering with the operation thereof.

Within the scope of my invention any suitable means may be employed for retaining the lap robe holder in engaged position with the robe and for the purposes of this specification I show springs 21, in Fig. 2 of the drawings, to perform this office. Each spring 21 as here shown, is formed of a single piece of spring wire doubled to form an arm 22, which bears upon the arm 16, of the base of one of the supporting devices, provided with coils 23 which pass around the pivot bolt 19 and the end portions of which form arms 24, which extend forwardly on opposite sides of one end of the bar 1, and terminate in reversely disposed hooks 25, which bear on said arm and cause the spring to exert downward pressure thereon and keep said securing bar in engaged position with the robe.

In Figs. 3, 4, I show the hub device 9 of the holder and the standards of the supporting devices provided with openings 26, which register when the robe holder is in engaged position with the robe and the shackle of a pad lock or other securing device may be passed through said registering openings to thus secure the holder in engaged position.

In Fig. 5, I show in detailed section on the plane indicated by the line $a$—$a$ of Fig. 4, a modified construction in which the hub member $9^a$ is provided on its inner side with a recess $9^b$. The standard $14^a$ of the supporting member is provided with a transverse bore $14^b$ to register with said recess when the holder is in engaged position, a key receiving socket $14^c$ spaced from the inner end of said bore, and a locking bolt 27 in the said bore and operated by a spring 28 to engage said bolt with said recess $9^b$. The said locking bolt has a stem 29, which extends into the socket $14^c$. A suitable key may be inserted in said socket and engaged with said stem and employed to move said bolt, against the tension of its spring, out of engagement with the recess $9^b$ in order to release the lap robe holder and permit the detachment of the robe.

I claim—

1. A lap robe securing and supporting device comprising a securing member to engage one end of a robe, a supporting member disposed at an angle to the securing member to engage the robe at another point, said securing member being movable into and out of operative position, means for holding the securing member in operative position, and means for connecting said members to an automobile with the supporting member in position to support the lap robe free from the sweep of the automobile pedals.

2. A lap robe holder for automobiles including mutually-connected robe-securing and robe-supporting members, the former being arranged to secure the front end of a robe and the latter being arranged to engage an intermediate portion of the robe and prevent said intermediate portion from coming in contact with the pedals of the automobile by sagging, and means for positioning said holder in operative relation to said pedals.

3. A lap robe clamping and supporting device for automobiles comprising a robe-clamping member to engage one end of a robe, a robe-supporting member to engage the robe at another point, said supporting member being disposed at an angle to the clamping member, and means for movably connecting the device to an automobile for movement of the clamping member into and out of clamping relation to a coöperating element on the automobile, the said securing and supporting members being connected together.

4. A lap robe securing and supporting device comprising a securing member to engage one end of a robe, a supporting member disposed at an angle to said securing member to engage the robe at another point, and means for movably connecting said members to the foot board of an automobile with the securing member in position for movement into and out of clamping relation to a coöperating contiguous portion of the automobile.

5. A lap robe securing and supporting attachment for automobiles comprising a pair of brackets each having a standard portion and a base portion, the latter to bear and be secured on the foot-board of the automobile, a bowed robe-securing bar, a bowed robe-supporting bar, the corresponding ends of said bars converging and being connected, pivots connecting the corresponding ends of said bars to said standard portions of said brackets for angular movement of said bars for the purpose set forth, and springs exerting downward pressure on said securing bar, the said springs having arms bearing on said standard portions, coils engaging said pivots and arms engaging said securing bar.

6. A lap robe securing and supporting device for automobiles comprising bowed securing and supporting members disposed at an angle to each other, and means for holding said members with the securing member in clamping relation to the foot board of an automobile and with the supporting member in position to support a lap robe above and free of the sweep of the pedals of the automobile when the robe is in use.

7. In combination with the foot board of an automobile, a lap robe securing and supporting attachment comprising a lap robe holder and a lap robe supporting element connected therewith and mounted for simultaneous movement into and out of operative positions, and means to retain said holder and said supporting element in operative positions.

8. A lap robe holder for automobiles having means to secure one end of a robe and also having means to engage the robe at another point and support the same above and clear of the sweep of the automobile pedals, said robe-securing and robe-supporting means being connected together, and means to retain said securing and supporting means in operative positions.

9. A lap robe holder for automobiles having means to secure one end of a robe and also having means to engage the robe at another point and support the same above and clear of the sweep of the automobile pedals, said robe-securing and robe-supporting means being connected together, and means to yieldably retain said securing and supporting means in operative positions.

10. A lap robe holder for automobiles comprising attaching brackets, an arched lap robe support pivotally connected at its ends with the brackets, lap robe clamping means carried by the arched support with the robe engaging portions thereof in spaced relation to said support, and means for holding the support with the clamping means in operative position.

11. In combination with a lap robe supporting element and means to secure the same on an automobile and adjacent the pedals of the latter, a robe-securing element to engage one end of the robe, said robe-securing element being connected with said supporting element and coöperating with an element of the automobile to hold the robe upon said robe-supporting element, and means to retain said securing element in operative position.

12. A lap robe holder, including a robe-supporting member, and a robe-clamping member associated therewith, said robe-clamping member coöperating with a contiguous portion of an automobile to hold the lap robe upon the supporting member, the latter sustaining the lap robe free from fouling the pedals of the automobile, and means to hold the robe-clamping member in engagement with the lap robe.

13. A lap robe holder, comprising mutually-connected supporting and clamping members, said clamping member coöperating with a contiguous portion of the automobile to hold the lap robe upon the supporting member, means for connecting said member, with the automobile, and means for holding said members in operative position.

14. A lap robe holder for automobiles, including a supporting member arranged adjacent to the automobile pedals and serving to support the lap robe free from the sweep of the pedals, and clamping means associated with said supporting member and coöperating with a contiguous portion of the automobile to clamp the lap robe in proximity to the pedals.

In testimony whereof, I affix my signature, in presence of two witnesses.

GEORGE H. CHANDLEE.

Witnesses:
J. W. GARNER,
M. T. MILLER.